(12) United States Patent
Pleva

(10) Patent No.: US 8,397,709 B1
(45) Date of Patent: Mar. 19, 2013

(54) INDIRECT SWIMMING POOL WATER HEATING SYSTEM

(75) Inventor: Mark G. Pleva, Woodward, IA (US)

(73) Assignee: Sentry Valve Co., Inc., Woodward, IA (US)

( * ) Notice: Subject to any disclaimer, the term of this patent is extended or adjusted under 35 U.S.C. 154(b) by 1241 days.

(21) Appl. No.: 11/011,418

(22) Filed: Dec. 14, 2004

(51) Int. Cl.
*A47J 27/00* (2006.01)

(52) U.S. Cl. ............ 126/373.1; 126/562; 126/374.1; 126/376.1

(58) Field of Classification Search ............ 126/562, 126/373.1, 374.1, 376.1; 4/493
See application file for complete search history.

(56) References Cited

U.S. PATENT DOCUMENTS

| | | | | |
|---|---|---|---|---|
| 4,455,227 A | * | 6/1984 | Harms et al. | 210/184 |
| 4,505,253 A | | 3/1985 | Mizuno et al. | |
| 4,627,416 A | | 12/1986 | Ito et al. | |
| 5,367,723 A | * | 11/1994 | Pleva et al. | 4/508 |
| 5,438,712 A | * | 8/1995 | Hubenthal | 4/493 |
| 6,080,971 A | | 6/2000 | Seitz et al. | 219/483 |
| 6,265,699 B1 | * | 7/2001 | Scott | 219/483 |
| 6,463,999 B1 | * | 10/2002 | Jung | 165/206 |

FOREIGN PATENT DOCUMENTS

DE  3203218  * 8/1983

OTHER PUBLICATIONS

Translation of Disclosure and Claims of DE3203218.*
"Continuous Flow Water Heaters for Residential" Brochure, Rinnai® 2003.
"Integrity" Commercial Continuous Flow Water Heaters, brochure, Rinnai®, 2003.

* cited by examiner

*Primary Examiner* — Alfred Basichas
(74) *Attorney, Agent, or Firm* — McKee, Voorhees & Sease, P.L.C.

(57) ABSTRACT

In an improved swimming pool water heating system, water in the pool circulates through a first loop from the pool to a surge pit and through a filter before returning to the pool. The heating system includes a second loop with a heat exchanger in the surge pit and a remote water heater. The pool water in the pit is heated by the heat exchanger. The first and second circulation loops are separate from one another. The heater may include multiple heating units which can be staged for sequential actuation, depending upon need. The second circulation loop is closed, such that the pool water does not flow through the heater, but rather is indirectly heated via the heat exchanger. The heater is isolated from the pool water.

17 Claims, 3 Drawing Sheets

INDIRECT SWIMMING POOL WATER HEATING SYSTEM

BACKGROUND OF THE INVENTION

Swimming pools come in many varieties for different uses, including swimming, wading, diving and playing. Both indoor and outdoor swimming pools are often heated so that the water temperature is comfortable for users of the pool. Conventional pool water heaters use gas fired furnaces or boilers to directly heat pipes carrying the pool water. Such conventional heaters are very inefficient, with typical efficiency being approximately 60%. Therefore, as an example, in order to obtain 800,000 net BTU's to heat the water, the burner would have to generate 1.4 million gross BTU's. The conventional furnace heaters are large and create a large footprint on the floor, thereby using valuable space in the pool filter or control room. For large pools, multiple heaters may be necessary, which increases the space utilization. Also, each burner is either on or off, which creates substantial inefficiencies if the water temperature only needs to be raised a small amount.

Start up of the pool each season with fresh water also causes adverse affects on the conventional combustion furnace heater. First, the fresh water generally is approximately 55° F. and flows through copper pipes extending through the heater. Due to the cold temperature of the water, condensation forms on the pipes, which then drips onto the burners in the fire box, resulting in incomplete combustion and creation of soot. The soot, which is acidic, then plugs the heat exchanger, which further decreases heating efficiencies. The controls for the heater senses the incomplete combustion, and calls for more heat, such that eventually the excess heat burns up the control system. The chlorine and other chemicals which are added to the fresh water also tends to decay the copper pipes internally, which are also attacked externally by the acidic soot.

Thus, conventional water heating furnaces for swimming pools have numerous problems.

A primary objective of the present invention is the provision of an improved water heating system for swimming pools which overcomes the problems of conventional pool heaters.

Another objective of the present invention is the provision of an indirect water heater for swimming pools.

A further objective of the present invention is the provision of a pool heating system which has a plurality of small heating units which can be sequentially staged to actuate one or more units, as needed.

Another objective of the present invention is the provision of a swimming pool heating system having improved efficiencies.

Still another objective of the present invention is the provision of a swimming pool heating system which requires no floor space.

A further objective of the present invention is the provision of an improved swimming pool water heating system which does not run chlorinated pool water through the heater.

Yet another objective of the present invention is the provision of a modular swimming pool water heating system with a plurality of heaters which operate independently of one another.

Another objective of the present invention is the provision an improved swimming pool water heating system which is easy to use, efficient in operation, and has an extended operating life.

These and other objectives become apparent from the following description of the invention.

SUMMARY OF THE INVENTION

The swimming pool water heating system of the present invention indirectly heats the pool water in an efficient manner using a heat exchanger. The pool water circulates in a first loop between the pool and surge pit. A heat exchanger is provided in the pit. A second loop circulates water between the heat exchanger and a remote heater. The pool water does not flow through the heater, but rather is indirectly heated by the water flowing through the heat exchanger. The water flowing through the second circulation loop does not contain the chlorine and other chemicals contained in the pool water. The heater includes a plurality of heating units which may be staged for sequential actuation in opposite directions. Electrical controls are provided for controlling each heater unit.

The method of heating of water in a swimming pool according to the invention comprises the steps of directing water from the pool to a pit, contacting the water in the pit with a heat exchanger in the pit such that the pool water absorbs heat from the heat exchanger, and returning the water from the pit to the pool. The pool water circulates in a first loop, while the heater water circulates in a second loop including the heat exchanger, with the pool water being indirectly heated by the heater water.

DETAILED DESCRIPTION OF THE PREFERRED EMBODIMENT

Figure 1:
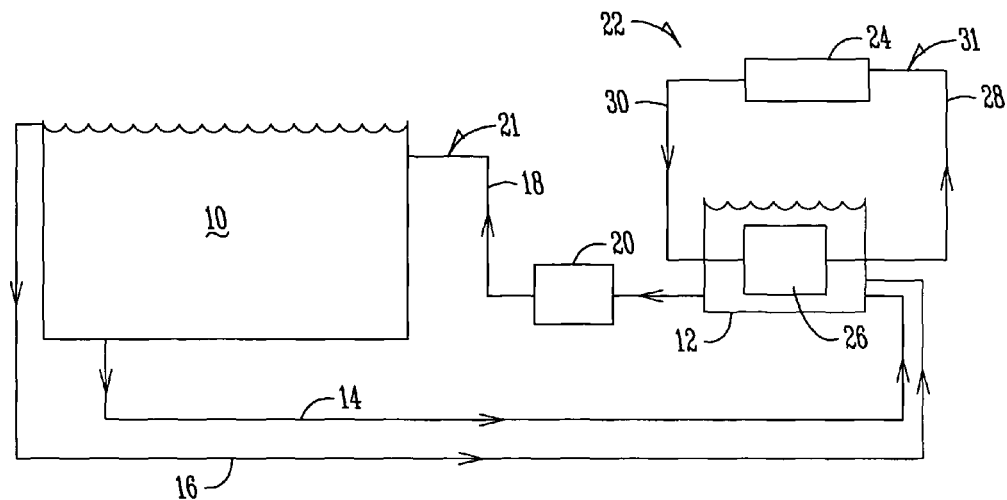
FIG. 1 is a schematic view of a swimming pool having the water heating system of the present invention.

A swimming pool is generally designated by the reference numeral 10 in the drawings. The pool is part of an aquatic system which includes a surge pit 12. A drain line 14 leads from the bottom of the pool 10 to the pit 12. A gutter system around the pool 10 also directs water to the pit 12 through a gutter line 16. Water is returned from the pit 12 to the pool 10 via a return line 18, which passes through a filter 20. The drain line 14, the gutter line 16 and the return line 18 define a first circulation 21 loop for the pool water.

The above components of the aquatic system are conventional and do not form a part of the present invention.

The present invention is directed towards a pool water heating system 22. The heating system 22 includes a heater 24, and a heat exchanger 26 located in the pit 12. A second circulating loop 31 is defined by a cool water line 28 extending between the heat exchanger 26 and the heater 24, and a hot water line 30 extending from the heater 24 to the heat exchanger 26, as shown in FIGS. 1 and 2.

The heater 24 preferably includes a plurality of heating units 32 which are mounted upon a wall. Thus, the heating units have no footprint to take up space on the floor of a filter or control room. Actuation of the heating units 32 is controlled by a control unit 36. The heating units 32 are staged for sequential actuation in opposite directions, so that the units can be actuated and deactuated as needed. By alternating the direction of actuation, even and extended wear is provided for the heating units 32.

Figure 2:
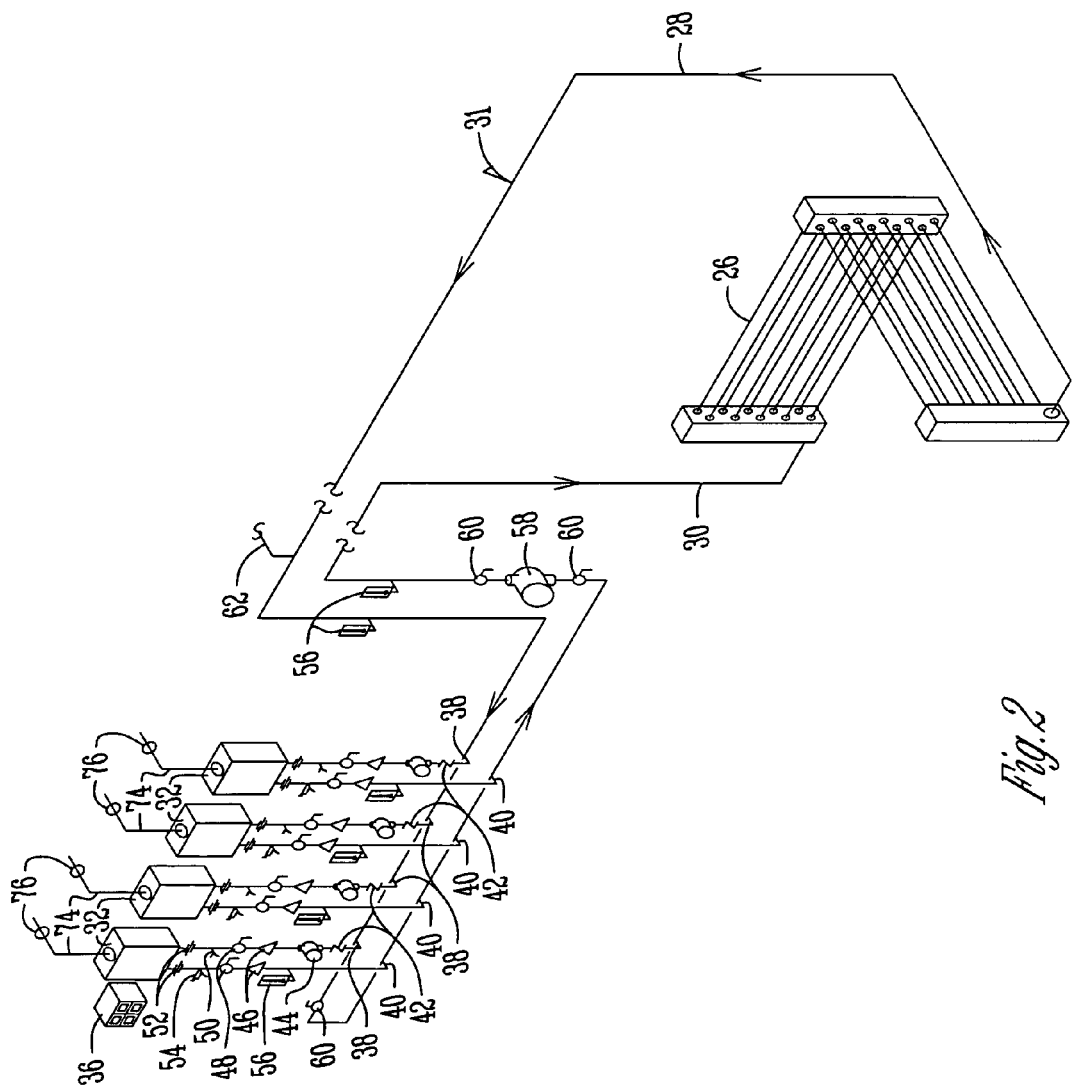
FIG. 2 is a perspective schematic view showing the mechanical piping for the heating system of the present invention.

In FIG. 2, the heat exchanger 26 is shown to be formed in an L-shaped configuration. It is understood that the heat exchanger may take other configurations without departing from the scope of the present invention. Similarly, the configuration of the components of the second loop 31 may be altered as desired without departing from the scope of the present invention. The heating system 22 may function with one or more heating units 32, depending upon the size of the pool 10.

One example of a commercially available heating unit which can be used is the commercial continuous flow water heaters, Model 2532 manufactured by Rinnai. Rinnai also sells a control system which can be used as the control unit 36. The Rinnai heating units operate on either natural gas or propane.

An inlet line 38 extends from the cool water line 28 to each heating unit 32. An outlet line 40 extends from each heating unit 32 to the hot water line 30. Each inlet line 38 includes a check valve 42, a pump 44, a reducer 46, a ball valve 48, a drain outlet 50, and a union coupler 52. Each outlet line 40 includes a union coupler 52, a temperature and pressure valve 54, a ball valve 48, a reducer 46, and a thermometer 56. Thermometers 56 are also provided on the cool water line 28 and hot water line 30. It is understood that the components shown in lines 28 and 30 are only one example of fluid flow controls which may be utilized.

The second circulation loop also includes a primary pump 58 in either the cold water line 28 or the hot water line 30. Shut off valves 60 are provided on either side of the pump 58, as well as at the end of the cold water line 28. A water inlet line 62 is provided for the cold water line 28. Normally, the circulation loop defined by the cold water line 28 and hot water line 30 is a closed loop. Generally, the water inlet line 62 is turned on only for the initial set up of the heating system 22.

Figure 3:
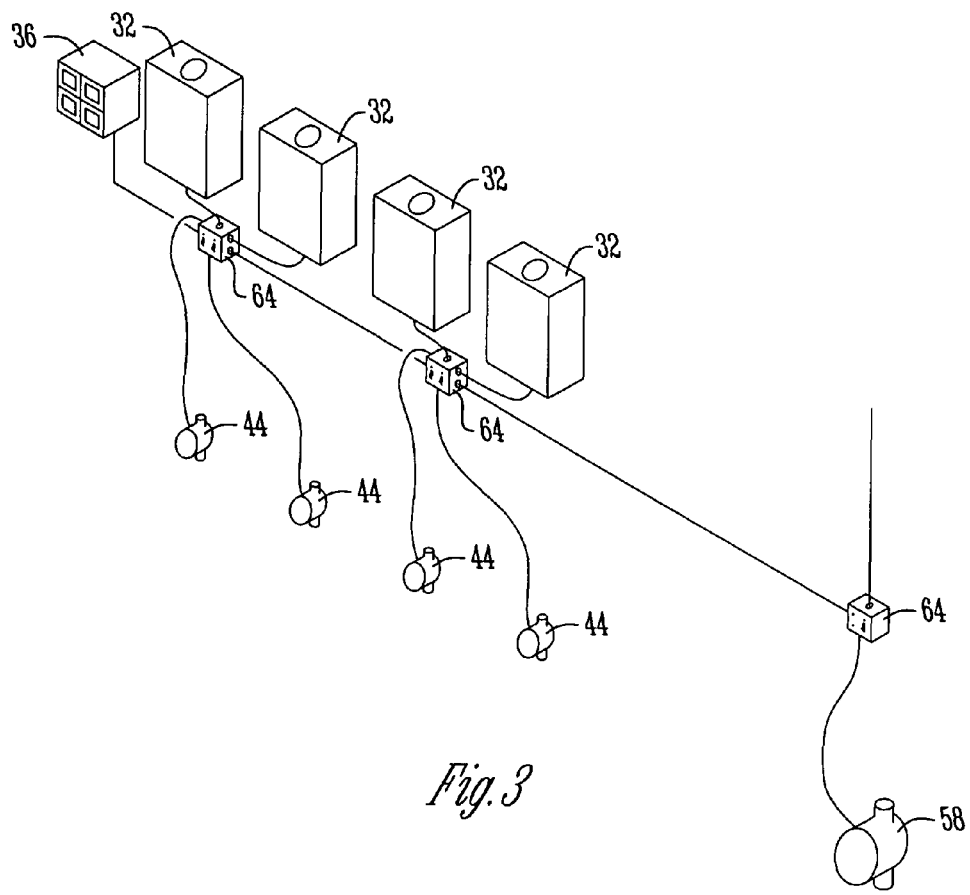
FIG. 3 is a perspective schematic view showing the electrical control for the heating system.

A preferred electrical schematic for the heating system 22 is shown in FIG. 3. The heating units 32, control unit 36, heater pumps 44, and primary pump 58 are electrically connected to on/off switches 64.

Figure 4:
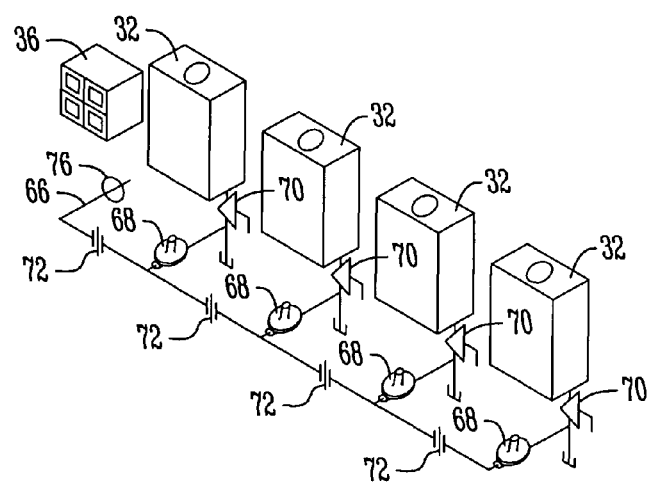
FIG. 4 is a perspective schematic showing the gas piping for the heating system.

FIG. 4 shows a preferred gas piping schematic for the heating units 32. A gas inlet line 66 branches to each of the heating units 32. Each branch includes a pump 68 and a cock valve 70. Union couplers 72 are provided in each branch of the gas line. Each heating unit 32 has a vent 74 which extends out of building through a conventional wall penetration 76.

In operation, the heating system 22 heats the pool water indirectly as the pool water continuously circulates through the first loop 21. The pool water in the pit absorbs heat from the heat exchanger 26 before being returned to the pool via return line 18. The first and second loops 21, 31 are separate from one another. The pool water does not flow through the heater 24. Since the second loop 31 is closed, the heater 24 always receives substantially constant temperature of water from the heat exchanger 26 through the cold water line 28. The temperature differential between the cool water line 28 and hot water line 30 may be 60° F. or more. This temperature differential is a result of the BTU's being transferred from the heat exchanger 26 to the pool water in the pit 12.

The temperature of the pool water tends to fluctuate throughout the day, depending upon air temperature and the quantity of fresh water which must be introduced to replace water lost to evaporation and splash out. With the heating system 22, the temperature of the pool water being returned through line 18 is relatively constant. As the temperature of the pool water entering the pit 12 through the lines 14 and 16 decreases or increases, the control unit 36 will actuate or deactuate the heating units as needed.

Figure 5:
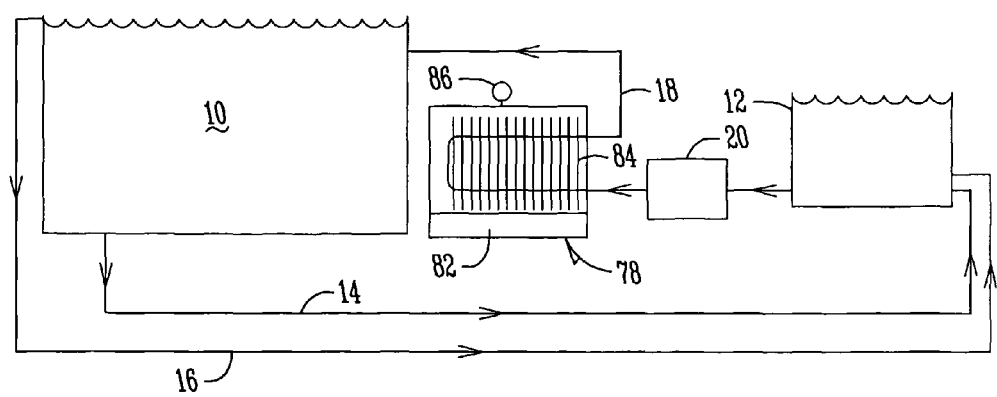
FIG. 5 is a schematic view showing a prior art swimming pool heating system.

FIG. 5 shows a conventional pool heating system 78. The heating system 78 is a furnace or boiler with a fire box 82 and a heat exchanger 34. The water return line 18 runs through the heat exchanger 84. A substantial amount of heat is lost through the vent 86 of the boiler 80. This prior art heating system 78 is subject to all of the problems discussed above.

The invention has been shown and described above with the preferred embodiments, and it is understood that many modifications, substitutions, and additions may be made which are within the intended spirit and scope of the invention. This heating system is not limited to swimming pools, but may be used to heat any body of water or other fluids. From the foregoing, it can be seen that the present invention accomplishes at least all of its stated objectives.

What is claimed is:

1. A water heating system for an aquatic system including a swimming pool, an open surge pit, and a first water circulation loop for circulating water between the pool and the pit, the heating system comprising:
   a heat exchanger in the surge pit;
   a tank-less gas water heater remote from the surge pit, the heater including a plurality of heating units; and
   a second normally closed circulation loop to circulate water between the heat exchanger and the heater;
   the second circulation loop being separate from the first circulation loop
   whereby pool water in the surge pit is heated by the heat exchanger.

2. The water heating system of claim 1 wherein the heating units are sequentially actuated.

3. The water heating system of claim 2 wherein the heating units are staged for sequential actuation in opposite directions.

4. The water heating system of claim 1 wherein the second circulation loop includes a water inlet and water outlet line for each heating unit.

5. The water heating system of claim 1 further comprising electrical controls for controlling each heating unit.

6. The water heating system of claim 1 further comprising electrical controls for controlling the heater.

7. The water heater system of claim 1 wherein the heating units are continuous flow heaters.

8. The system of claim 1 wherein the heat exchanger includes horizontal, parallel pipes through which the water in the second loop flows.

9. A method of heating water in a swimming pool, comprising:
   directing water from the pool to an open surge pit;
   heating the water in the pit with a heat exchanger;
   circulating heater water in a normally closed circulation loop through a continuous flow water heater having a plurality of heating units and a heat exchanger in the pit so as to heat the pool water in the pit;
   circulating the pool water in a loop through the surge pit and separate from the heater water;
   sequentially actuating the heating units;
   returning heated pool water from the pit to the pool.

10. The method of claim 9 further comprising alternating the sequential actuation of the heating units in opposite directions.

11. The method of claim 9 further comprising isolating the pool water from the heater.

12. The method of claim 9 wherein the heater water flows continuously through the heating units without storage in the heating units.

13. The method of claim 9 further comprising generating at least 500,000 BTU's with the heating units.

14. The method of claim 9 wherein the heater water is circulated through parallel, horizontal pipes in the heat exchanger.

15. A method of heating water in a swimming pool, comprising:
   circulating pool water in a first open loop including the swimming pool and an open surge pit;
   circulating heater water in a second closed loop including a heat exchanger in the surge pit and a plurality of continuous flow water heating units to heat the heater water; and
   indirectly heating the pool water in the surge pit with the heater water via the heat exchanger in the open surge pit.

16. The method of claim 15 further comprising positioning the first loop remotely from the heating units.

17. The water heater system of claim 15 wherein the heating units cumulatively generate 800,000 BTU's.

* * * * *